(12) United States Patent
Moore (10) Patent No.: US 8,573,057 B2
(45) Date of Patent: Nov. 5, 2013

(54) SENSOR MOUNT VIBRATION REDUCTION

(75) Inventor: Robert H. Moore, Anitioch, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 267 days.

(21) Appl. No.: 13/096,450

(22) Filed: Apr. 28, 2011

(65) Prior Publication Data

US 2012/0291551 A1 Nov. 22, 2012

(51) Int. Cl.
*G01C 19/5607* (2012.01)
*G01C 19/5621* (2012.01)

(52) U.S. Cl.
USPC ..................................................... 73/504.16

(58) Field of Classification Search
USPC ............... 73/504.16, 504.12, 504.04, 504.15; 310/370, 323.21, 367
See application file for complete search history.

(56) References Cited

U.S. PATENT DOCUMENTS

| | | | | |
|---|---|---|---|---|
| 4,538,461 | A * | 9/1985 | Juptner et al. | 73/504.16 |
| 5,131,273 | A | 7/1992 | Tabata et al. | |
| 5,763,781 | A * | 6/1998 | Netzer | 73/504.16 |
| 5,998,911 | A * | 12/1999 | Kikuchi et al. | 310/367 |
| 6,151,965 | A * | 11/2000 | Watarai | 73/504.16 |
| 6,262,520 | B1 * | 7/2001 | Knowles | 310/370 |
| 6,701,785 | B2 * | 3/2004 | Knowles et al. | 73/504.16 |
| 7,436,107 | B2 * | 10/2008 | Aizawa et al. | 310/370 |
| 7,523,537 | B1 * | 4/2009 | Knowles et al. | 29/594 |
| 2001/0054860 | A1 | 12/2001 | Knowles | |
| 2010/0096953 | A1 * | 4/2010 | Iwai | 310/370 |

FOREIGN PATENT DOCUMENTS

| JP | 2006275636 A | 10/2006 |
|---|---|---|
| JP | 2008209116 A | 9/2008 |

OTHER PUBLICATIONS

International Search Report and Written Opinion for PCT/US2012/035367, mailed Nov. 30, 2012.

* cited by examiner

*Primary Examiner* — Helen Kwok
(74) *Attorney, Agent, or Firm* — Hunter Clark PLLC (57) ABSTRACT

Techniques are provided for reducing mount vibration in an inertial rate sensor (IRS). For example, if oscillation in an IRS's vibratory members, vibrating along a first axis, cause displacement in the IRS's mount along a second axis, the vibratory members can be aligned so that the vibratory members have some component of movement along the second axis during oscillation. This component of movement can help reduce the displacement of the IRS's mount along the second axis. It can further reduce sensitivity to changes in the boundary conditions of an IRS (e.g., vibrations and other movements at the mount from forces external to the IRS). Vibratory members further can have portions of increased mass at the vibratory members' tips, which can impact the alignment of the vibratory members. These examples, however, are not exhaustive.

20 Claims, 6 Drawing Sheets

SENSOR MOUNT VIBRATION REDUCTION

BACKGROUND

Inertial Sensors can detect and measure various types of acceleration, tilt, shock, vibration, rotation, and multiple degrees-of-freedom motion, which can be used in industrial, medical, communications, consumer and automotive applications. To help provide motion detection and measurement, these sensors include accelerometers and gyroscopes.

Some Inertial Rate Sensors (IRSs), such as vibratory gyroscopes, can sense rotation when a driven oscillation of one or more vibratory members is coupled to another mode of the structure due the Coriolis Effect. A typical tuning fork gyroscope, for example, can sense rotation by using tines as vibratory members. Tuning fork gyroscopes typically have two tines, but other types of vibratory gyroscopes can have a different number of vibratory members. When the tines are driven in oscillation, a rotation about an axis parallel to the longitudinal axis (i.e., elongated dimension) of the tines can couple the driven oscillation into an anti-phase, out-of-plane motion of the tines. In other words, the tines move up and down out of the plane of the tuning fork gyroscope, out-of-phase with each other. This mode of oscillation is often called the sense mode (or pickup mode) of the tuning fork gyroscope. The axis about which rotation can be sensed is called the sensitive axis (or input axis).

Although oscillations of such an IRS enable the IRS to sense rotation, the oscillations also can introduce unwanted displacement in a mount of the IRS. For example, a vibratory gyroscope can be substantially balanced for motion along the axis of oscillatory movement, but can have unbalanced motion in the other axes. In particular, stresses at and/or near the crotch regions connecting the vibratory members can cause the rest of the structure to undergo motion perpendicular to the axis of oscillatory movement. Such unwanted displacement can negatively impact the stability and accuracy of an IRS.

SUMMARY

An example of an inertial rate sensor according to the disclosure includes a base and a plurality of vibratory members coupled with the base and positioned symmetrically about an axis of symmetry. Each vibratory member includes an elongate dimension extending outward from the base to a tip of the vibratory member, and an axis of motion along which the vibratory member is configured to move when driven in oscillation. The axis of motion is substantially perpendicular to the elongate dimension, and the elongate dimension of each vibratory member is angled from the axis of symmetry such that each vibratory member, when driven in oscillation, includes a component of motion parallel to the axis of symmetry.

Implementations of such an inertial rate sensor may include one or more of the following features. Each vibratory member is tapered such that a lateral dimension of each vibratory member decreases from the base to the tip of the vibratory member. The base and the plurality of vibratory members comprise a piezoelectric material. Each of the plurality of vibratory members includes a portion of increased mass at the tip of the vibratory member. For each of the plurality of vibratory members, the portion of increased mass is symmetric about an axis parallel to the elongate dimension of the vibratory member. For each of the plurality of vibratory members, the portion of increased mass is symmetric about an axis parallel to the axis of symmetry.

An example of a tuning fork for use in an inertial rate sensor according to the disclosure includes a base having a mounting area, and two vibratory members coupled with the base and positioned symmetrically on opposite sides of an axis of symmetry. Each vibratory member includes an elongate dimension extending outward from the base to a tip of the vibratory member, and an axis of motion along which the vibratory member is configured to move when driven in oscillation, the axis of motion being substantially perpendicular to the elongate dimension and substantially coplanar with the axis of symmetry and the elongate dimension. The elongate dimension of each vibratory member is angled from the axis of symmetry such that each vibratory member, when driven in oscillation, includes a component of motion parallel to the axis of symmetry.

Implementations of such a tuning fork for use in an inertial rate sensor may include one or more of the following features. Each vibratory member is tapered such that a lateral dimension of each vibratory member decreases from the base to the tip of the vibratory member. The base and the plurality of vibratory members comprise a piezoelectric material. Each of the plurality of vibratory members includes a portion of increased mass at the tip of the vibratory member. For each of the plurality of vibratory members, the portion of increased mass is symmetric about an axis parallel to the elongate dimension of the vibratory member. For each of the plurality of vibratory members, the portion of increased mass is symmetric about an axis parallel to the axis of symmetry. An angle between the elongate dimension of each vibratory member and the axis of symmetry is within a range of 1 to 3 degrees. An angle between the elongate dimension of each vibratory member and the axis of symmetry is configured to reduce vibrations at the mounting area when the two vibratory members are driven in oscillation. A plurality of sense members is coupled with the body, the sense members configured to detect rotation about a sensitive axis when the two vibratory members are driven in oscillation.

An example of a structure for use in the inertial rate sensor according to the disclosure includes a body of piezoelectric material, the body including a base and a plurality of vibratory members. The plurality of vibratory members are coupled with the base and positioned symmetrically about an axis of symmetry. Each vibratory member includes an elongate dimension extending outward from the base to a tip of the vibratory member, a portion of increased mass at the tip of the vibratory member; and an axis of motion along which the vibratory member is configured to move when driven in oscillation, the axis of motion being substantially perpendicular to the elongate dimension and substantially coplanar with the axis of symmetry and the elongate dimension. The elongate dimension of each vibratory member is angled from the axis of symmetry such that the vibratory member, when driven in oscillation, includes a component of motion along the axis of symmetry.

Implementations of such a structure for use in the inertial rate sensor may include one or more of the following features. For each of the plurality of vibratory members, the portion of increased mass is symmetric about an axis parallel to the elongate dimension of the vibratory member. For each of the plurality of vibratory members, the portion of increased mass is symmetric about an axis parallel to the axis of symmetry. A plurality of sense members is coupled with the body, the sense members configured to detect rotation about a sensitive axis when the two vibratory members are driven in oscillation. Each vibratory member is tapered such that a lateral dimension of each vibratory member decreases from the base to the tip of the vibratory member.

Items and/or techniques described herein may provide one or more of the following capabilities, as well as other capabilities not mentioned. Reduced displacement on a IRS mount during oscillation of vibratory members (e.g., drive tines of a tuning fork IRS). Less sensitivity to changes in the boundary conditions of an IRS (e.g., vibrations at the mount due to external factors). Increased stability and accuracy of an IRS. Further, it may be possible for an effect noted above to be achieved by means other than that noted, and a noted item/technique may not necessarily yield the noted effect.

DETAILED DESCRIPTION OF THE INVENTION

Techniques are discussed herein for reducing mount vibration on an inertial rate sensor (IRS). For example, if oscillation in an IRS's vibratory members, vibrating along a first axis, cause displacement in the IRS's mount along a second axis, the vibratory members can be aligned so that the vibratory members have some component of movement along the second axis during oscillation. This component of movement can help reduce the displacement of the IRS's mount along the second axis. It can further reduce sensitivity to changes in the boundary conditions of an IRS (e.g., vibrations and other movements at the mount from forces external to the IRS, or changes in the mount properties, such as strength or mechanical damping). Vibratory members further can have portions of increased mass at the vibratory members' tips, which can impact the alignment of the vibratory members. These examples, however, are not exhaustive.

IRSs can include a wide variety of oscillating gyroscopes. In ordinary, single-ended tuning fork gyroscopes, the driving of the vibratory members (e.g., fork tines) and sensing of the Coriolis-induced response must occur in the same pair of tines. In order to simplify the detection and improve the signal-to-noise ratio, among other reasons, a second pair of tines can be used. An example of such dual-ended structures are provided in U.S. Pat. No. 6,507,141 and U.S. Pat. No. 6,262,520, both of which are fully incorporated herein by reference.

Figure 1:
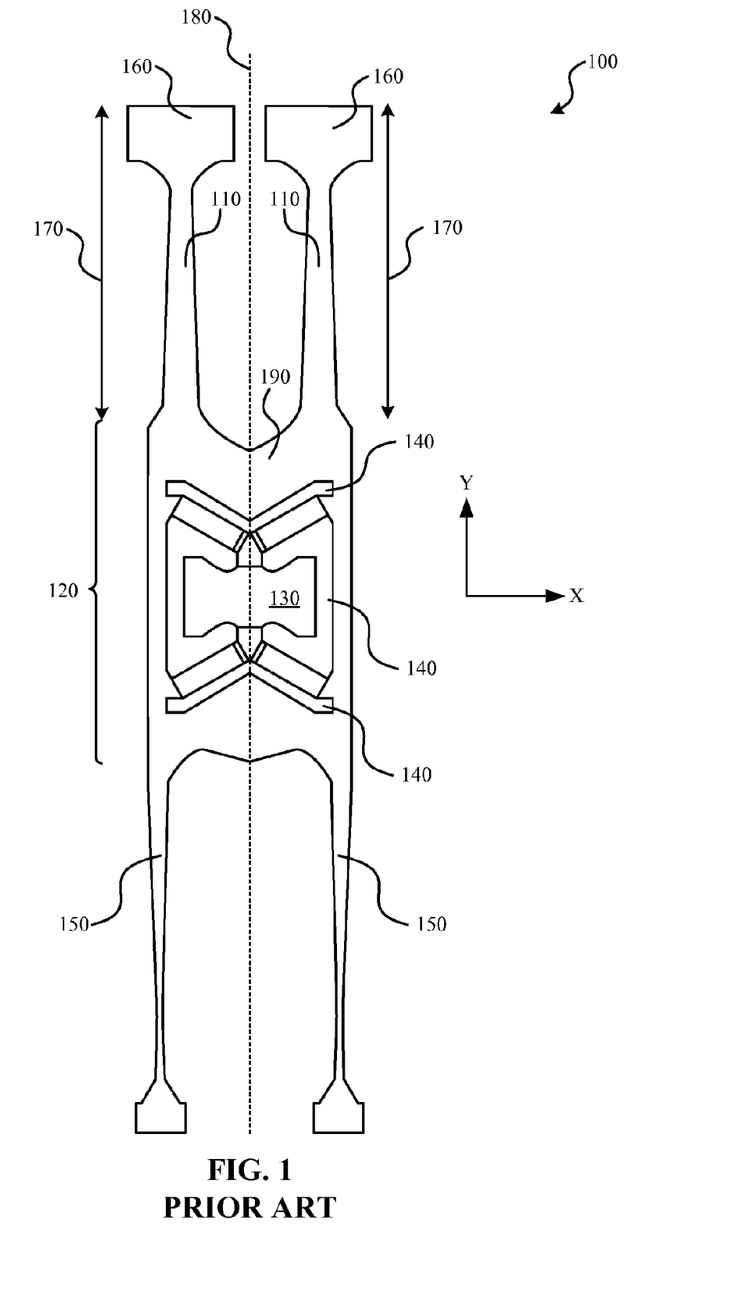
FIG. 1 is a front view of a tuning fork gyroscope with vibratory members substantially parallel to an axis of symmetry.

FIG. 1 is a front view of an example dual-ended tuning fork gyroscope 100. Among other features, the tuning fork gyroscope 100 comprises a pair of vibratory members, or drive tines 110 coupled with a base 120 at a crotch region 190. The base 120 includes a mount 130 for mounting the tuning fork gyroscope 100 to a pedestal or other external object. Sense tines 150 are provided for sensing rotation by means of the pickup mode of the tuning fork gyroscope 100. Various isolation slots 140 are provided to help reduce coupling of movement between the drive tines 110 and other components of the tuning fork gyroscope 100.

The tuning fork gyroscope 100 can comprise a piezoelectric material, such as crystalline quartz. The piezoelectric effect in quartz allows the tuning fork gyroscope 100 to be driven in oscillation by applying an oscillating voltage to electrodes (not shown) deposited on the drive tines 110. In addition, when the tuning fork gyroscope 100 responds to rotation, the out-of-plane motion of the tuning fork gyroscope 100 can be detected by measuring the piezoelectrically-induced charge. The detection is done using specially arranged electrodes (not shown) that collect this charge. These electrodes are connected via electrical traces to a charge amplifier circuit, which is not part of the fork itself.

The tuning fork gyroscope 100 is symmetrical about an axis of symmetry 180 parallel to the Y axis shown in FIG. 1. Drive tines 110 are symmetrically positioned on opposite sides of the axis of symmetry 180 such that, when not driven in oscillation, the elongate dimension of each of the drive tines 170 is approximately parallel to the axis of symmetry 180. Sense tines 150 are provided at the opposite end of the tuning fork gyroscope 100.

The electrical output of the tuning fork gyroscope 100 can be viewed as an amplitude modulated (AM) signal, with the drive oscillation frequency of the tuning fork gyroscope 100 as the AM carrier frequency. A constant rotation of the tuning fork gyroscope 100 causes an output signal at the drive mode frequency. Erroneous signals at this frequency are undesirable because they can result in offsets or fluctuations in the sensor signal. Conventional demodulation techniques can be used to bring the modulated signal from the carrier band to baseband, which is at or near direct current (DC).

Figure 2A:
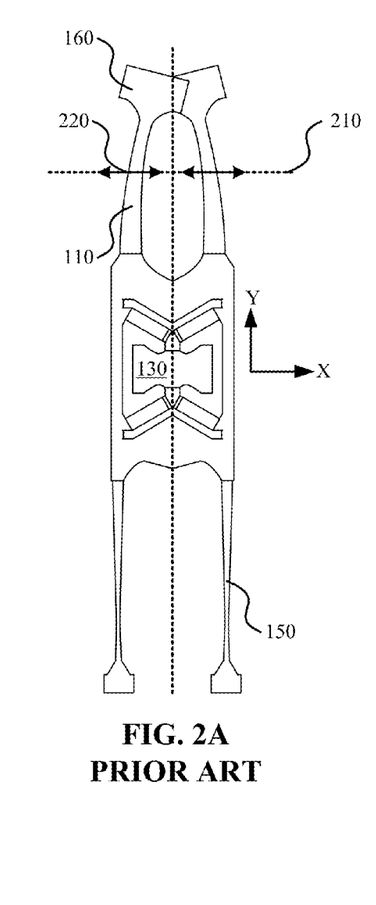
FIG. 2A is a front view of the tuning fork gyroscope of FIG. 1 during oscillation of the vibratory members in the drive mode (exaggerated for purposes of illustration).
Figure 2B:
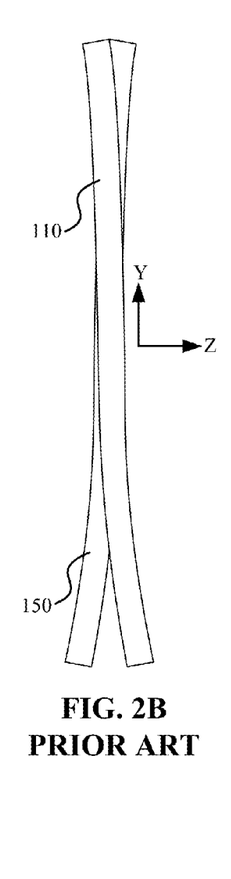
FIG. 2B is a side view of the tuning fork gyroscope of FIG. 1 during oscillation of the vibratory members in the sense mode (exaggerated for purposes of illustration).
Figure 2C:
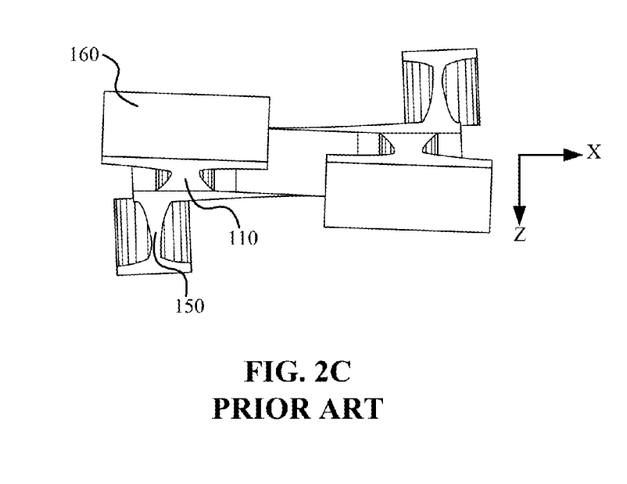
FIG. 2C is a top view of the tuning fork gyroscope of FIG. 1 during oscillation of the vibratory members in the sense mode (exaggerated for purposes of illustration).

FIGS. 2A-2C illustrate the movement of the tuning fork gyroscope 100 of FIG. 1 when driven in oscillation. FIG. 2A is a front view of the tuning fork gyroscope 100 of FIG. 1, FIG. 2B is a side view, and FIG. 2C is a top view. Coordinate axes are provided for ease of reference and to show orientation. For illustrative purposes, the motion shown in FIG. 2A is exaggerated. As indicated by arrows 220 in FIG. 2A, the drive tines 110 are driven in oscillation predominantly in the direction of the X axis (i.e., within the plane of the tuning fork gyroscope 100) along an axis of oscillatory movement, or axis of motion 210.

A balanced motion in the sense mode of oscillation is desirable, just as it is for the drive oscillation. In the tuning fork gyroscope 100 (and other tuning fork gyroscopes) a rotation about a sensitive axis (not shown) induces out-of-plane motion of the tines, as shown in FIGS. 2B and 2C. This results in a twisting of the tines 110, 150 of the tuning fork gyroscope 100, as shown in FIG. 2C. The mount 130 of the tuning fork gyroscope 100 must absorb this vibration, making the tuning fork gyroscope 100 sensitive to changes in the strength or mechanical damping of the mount 130. Also, an input of vibration at the mount 130, if it includes any rotational motion at frequencies near the drive or sense mode natural frequencies, can directly excite the sense tines 150 to vibrate, causing an erroneous output signal. However, as shown in FIG. 2C, the sense tines 150 of the tuning fork gyroscope 100 can be designed such that the twisting of drive tines 110 is nearly cancelled by an opposite twisting at the sense tines 150.

Figure 3:
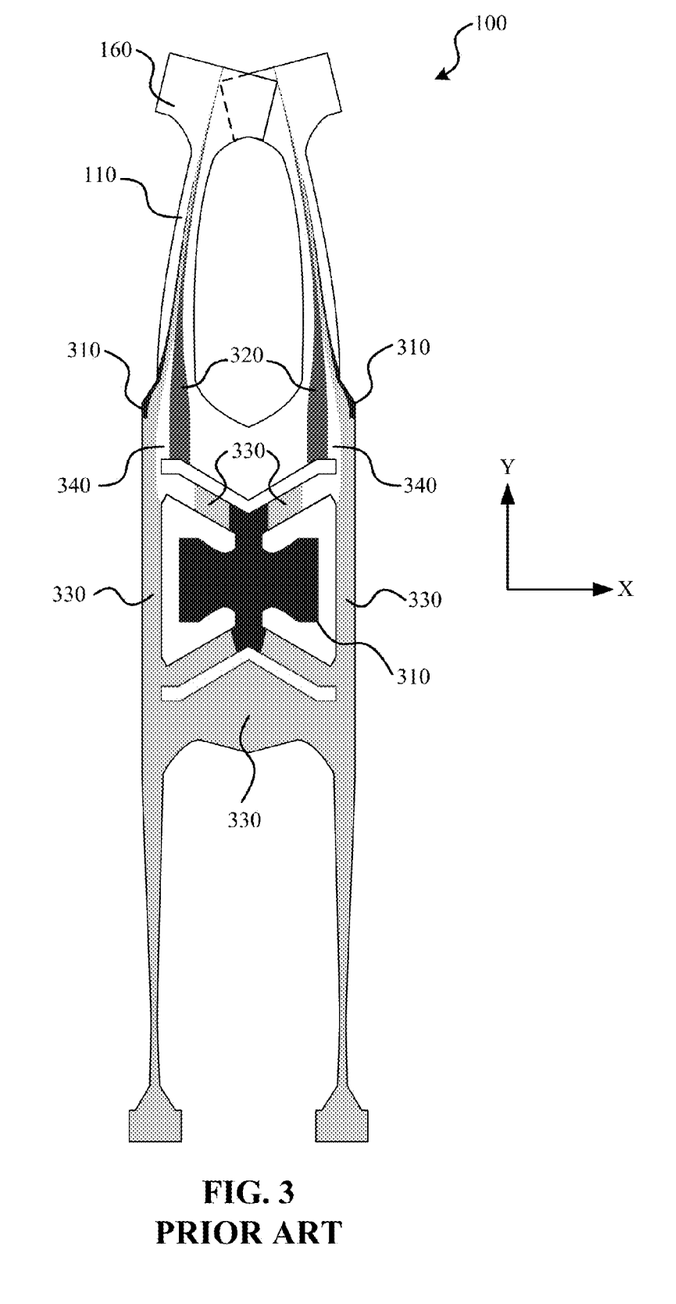
FIG. 3 is a simplified front view of a simulation of the tuning fork gyroscope of FIG. 1, showing structural displacement during oscillation of the vibratory members.

Despite being substantially balanced for motion along the axis of motion (i.e., parallel to the X-axis shown in FIGS. 2A-2C), other axes can experience unbalanced motion. In particular, stresses on the drive tines 110 near the base 120 can cause the rest of the structure to undergo motion along the y-axis. FIG. 3 is a simplified front view of a simulation of the tuning fork gyroscope 100 of FIG. 1, showing structural Y-axis displacement during oscillation of the drive tines 110 at a moment when the drive tines 110 are driven inwardly (i.e. toward the axis of symmetry (not shown)). Portions of the tuning fork gyroscope 100 (excluding the portions of increased mass 160 (also known as tine "heads" or "hammers") at the tip of the drive tines 110) are shaded differently according to the relative amount. Darker portions 310 and 320 represent portions experiencing extreme positive and negative displacement, respectively. Lighter portions 330 and 340 represent portions experiencing moderate positive and negative displacement, respectively.

Displacement is reversed (e.g., from positive to negative) during oscillation at a moment when the drive tines 110 are driven outwardly (i.e. away from the axis of symmetry (not shown)). Therefore, for example, as the drive tines 110 oscillate from an inward position to an outward position along the axis of motion (parallel to the X axis), the mount 130 experiences a change from extreme positive Y-axis displacement (indicated in FIG. 3 by region 310) to extreme negative Y-axis displacement. This oscillatory displacement of the mount 130 is therefore substantially perpendicular to the axis of motion.

This type of vibration of the mount 130 along the Y-axis is undesirable. For instance, it is directly transmitted to the external environment of the tuning fork gyroscope 100, making the tuning fork gyroscope 100 sensitive to changes in its boundary conditions. Along these lines, the external mechanical environment may ultimately couple some of this motion back into the tuning fork gyroscope 100 via the mount 130, particularly via rotational motion about the sensitive axis. For example, a resonant interaction between the tuning fork gyroscope 100 and the structure to which it is mounted can occur if the structure has resonances at or near the drive oscillation frequency of the tuning fork gyroscope 100. Alternatively, if the tuning fork gyroscope 100 is suspended within a compliant member in order to provide vibration isolation, the tuning fork gyroscope 100 will oscillate in translation along the Y-axis within the compliant suspension. This can make the tuning fork output sensitive to changes in properties of the compliant suspension. These factors can cause unwanted offsets in the output, reducing stability and accuracy.

The vibration of the mount 130 along the Y-axis can be reduced or eliminated by adjusting the alignment of drive tines 110 of the tuning fork gyroscope 100. As discussed above, each of the drive tines 110 of the tuning fork gyroscope 100 are aligned such that the elongate dimension 170 is parallel to the Y-axis. When driven to oscillate, the drive tines 110 cause some amount of y-axis motion as shown in FIGS. 2A-2C. However, this Y-axis displacement can be counterbalanced by adjusting the alignment of drive tines 110. For example, if the elongate dimension 170 of each drive tine 110 is no longer parallel to the Y-axis, but is angled outward so that the drive tines 110 form a slight "Y" shape, the motion of the drive tines 110 (including portions of increased mass 160) will now have a component of oscillation directed along the Y-axis. A precise adjustment of the angle of the drive tines 110 allows the Y-axis motion at the mount 130 to be minimized.

Figure 4:
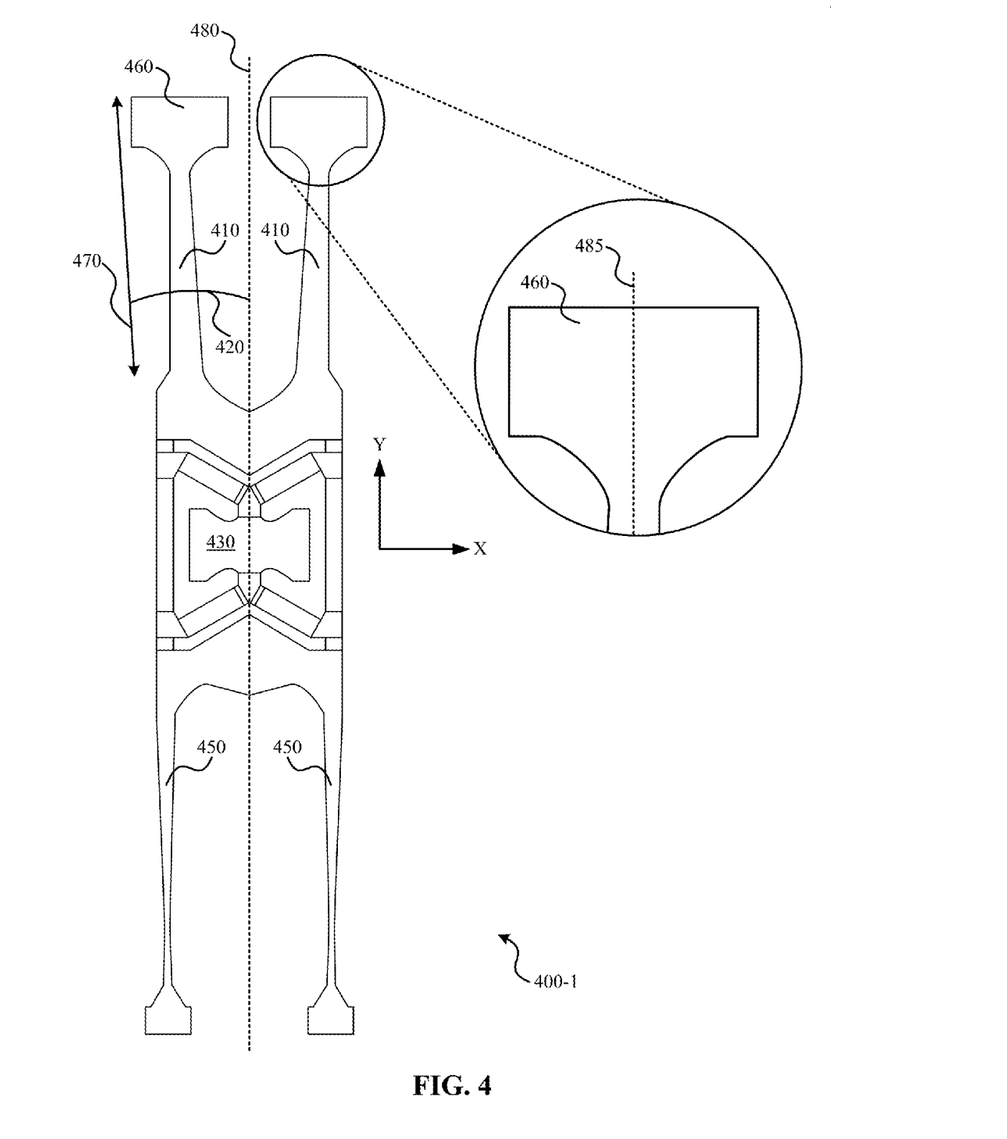
FIG. 4 is a front view of a first configuration of a modified tuning fork gyroscope with reduced mount vibration.

FIG. 4 is a front view of a first configuration of a modified tuning fork gyroscope 400-1 with reduced mount vibration. Many features are similar to the tuning fork gyroscope 100 of FIG. 1, such as tapered tines 410, 450 portions of increased mass (on either or both sets of tines 410, 450), a mount 430, etc. In contrast to the tuning fork gyroscope 100 of FIG. 1, the tuning fork gyroscope 400-1 in FIG. 4 has modified drive tines 410 that are angled slightly outward. More specifically, the elongate dimension 470 of each of the modified drive tines 410 is not parallel to the Y-axis (or axis of symmetry 480). Rather, there is an angle 420 between the elongate dimension 470 and the Y-axis such that, when each modified drive tine 410 is driven in oscillation along an axis of motion, there is a component of motion parallel to the Y-axis (or axis of symmetry).

Depending on the design of the structure, the angle 420 from the Y-axis at which each modified drive tine 410 may vary. Gyroscopes with designs similar to the modified tuning fork gyroscope 400-1 shown in FIG. 4 may require a angle within a range of 1-3 degrees. Other configurations may require a larger or smaller angle (or range of angles) to reduce mount vibration, depending on various factors, such as the mass of the drive tines 470 and/or the mass of the rest of the structure.

The modified tuning fork gyroscope 400-1 of FIG. 4 further shows how portions of increased mass 460 of the modified drive tines 410 can be configured, relative to the positioning of the drive tines. For example, each portion of increased mass 460 can be symmetric about an axis 485 parallel to the axis of symmetry 480. Therefore, because the elongate dimension 470 of each drive tine 410 is angled with respect to the axis of symmetry 480, the motion of each portion of increased mass 460 is correspondingly angled with respect to the rest of the drive tine 410.

Figure 6:
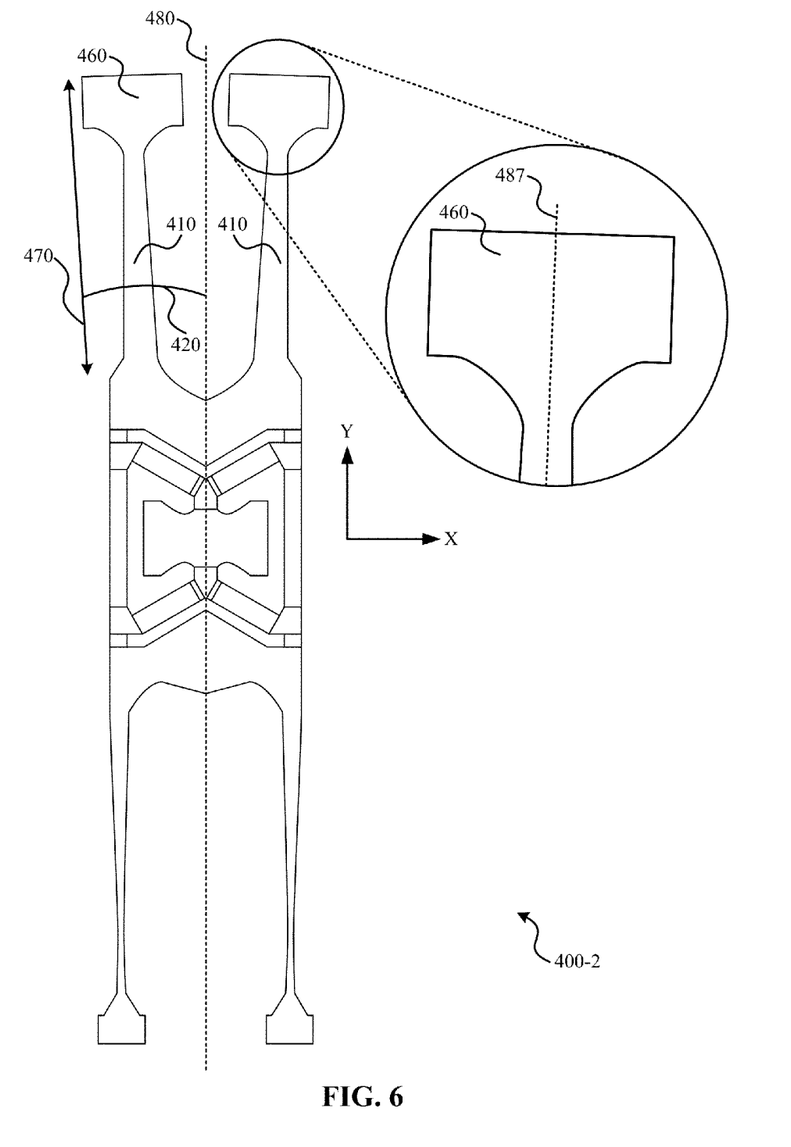
FIG. 6 is a front view of a second configuration of a modified tuning fork gyroscope.

In an alternative configuration of a modified tuning fork gyroscope 400-2, shown in FIG. 6, each portion of increased mass 460 is symmetric about an axis 487 parallel to elongate dimension 470 of the drive tine 460 to which the portion of increased mass 460 is coupled. Therefore, because the elongate dimension 470 of each drive tine 410 is angled with respect to the axis of symmetry 480, each portion of increased mass 460 is correspondingly angled with respect to the axis of symmetry 480. (To reduce clutter in FIG. 6, the arrow indicating the elongate dimension of the tine 410 corresponding to the axis 487 has been omitted.) Other configurations can include angling one edge or both edges by rotation to arrive at a modified angle of vibration.

Figure 5:
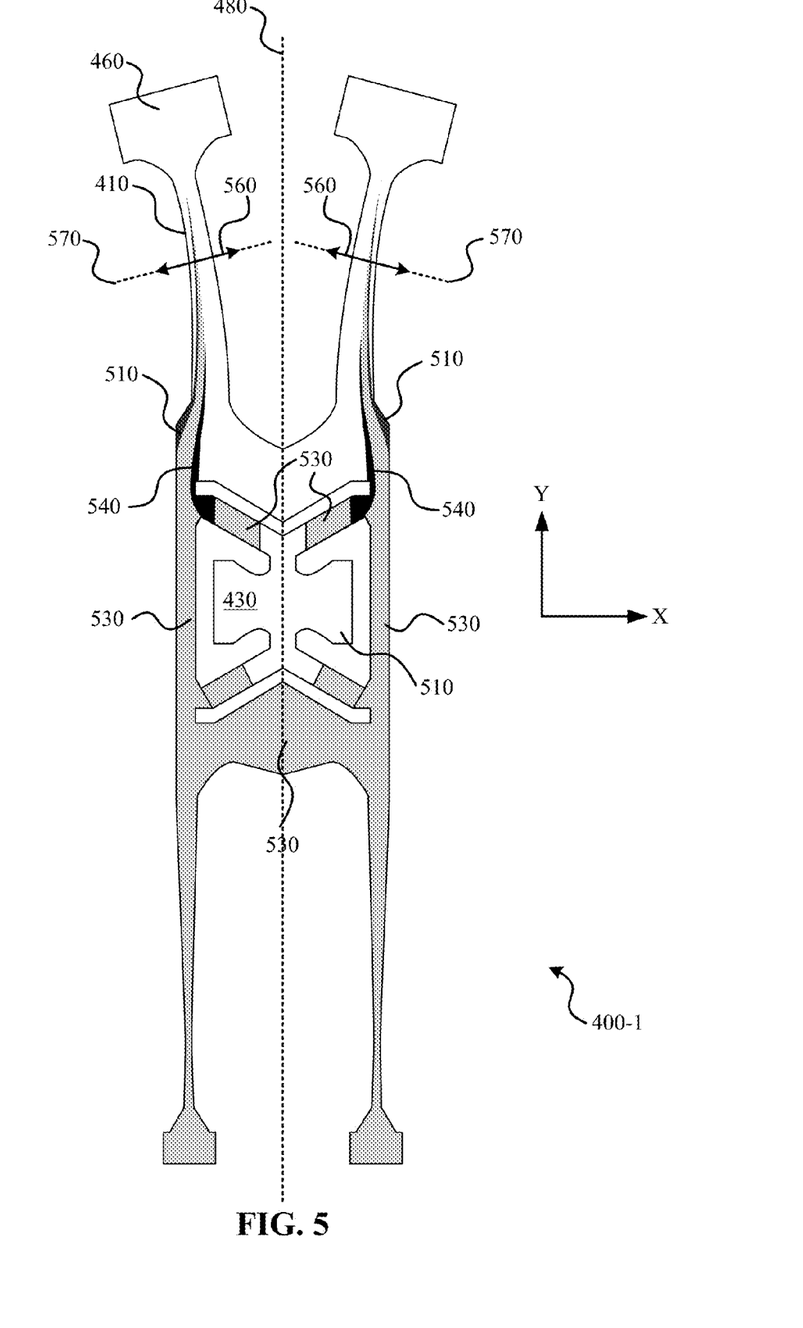
FIG. 5 is a simplified front view of a simulation of the modified tuning fork gyroscope of FIG. 4, showing structural displacement during oscillation of the vibratory members (exaggerated for purposes of illustration).

FIG. 5 is a simplified front view of a simulation of the modified tuning fork gyroscope 400-1 of FIG. 4. Similar to FIG. 3, FIG. 5 illustrates structural Y-axis displacement during oscillation of the drive tines 110. Here, the displacement is shown at a moment when the drive tines 110 are driven outwardly (i.e. away from the axis of symmetry 480). As shown by arrows 560, each modified drive tine 410 is configured to move along an axis of motion 570. Each axis of motion 570 is substantially perpendicular to the elongate dimension of the modified drive tine 410 and substantially coplanar with the axis of symmetry 480 and the elongate dimension (i.e., the axis of motion is within the XY plane). (In pickup mode, however, modified drive tines 410 will be displaced in the direction of the Z axis, similar to that shown FIGS. 2B and 2C.)

Similar to FIG. 3, portions of the modified tuning fork gyroscope 400-1 shown in FIG. 5 (excluding the portions of increased mass 460 at the tip of the drive tines 410, the unshaded regions within the drive tines 410 and the unshaded regions of the drive crotch area) are shaded differently according to the relative amount of Y-axis displacement. Darker portions 510 and 540 represent portions experiencing extreme negative and positive displacement, respectively. Lighter portions 530 represent portions experiencing moderate positive displacement. Portion 510 indicates a portion experiencing little or no Y-axis displacement. Thus, according to the simulation illustrated in FIG. 5, mount 430 of modified tuning fork gyroscope 400-1 experiences little or no Y-axis displacement when the drive tines 110 are driven outwardly. Moreover, the mount 430 experiences similarly reduced displacement when the drive tines 110 are driven inwardly. This reduction in Y-axis displacement (e.g., displacement along the axis of symmetry) reduces the sensitivity of the modified tuning fork gyroscope 400-1 to changes in the boundary conditions and increases stability and accuracy of the modified tuning fork gyroscope 400-1.

The principles and techniques described herein for reducing motion along an axis of symmetry can be applied more broadly to other types of IRSs, as well as other structures with vibratory members. For example, unwanted motion or reaction at one or more mount or anchor points of a vibratory IRS caused by the deformation of the structure and/or suspension can be corrected with an angular adjustment of primary vibrating members to include a component of motion along a direction of the unwanted motion. Additionally or alternatively, these IRSs can have more or less vibratory members than the tuning fork gyroscopes described herein, and can comprise materials other than quartz, such as silicon.

Various computer programs provide modeling tools that can be used to help determine the amount of angular adjustment needed to mitigate or eliminate the unwanted motion in an IRS (or other structure with vibratory members). As indicated above, angular adjustment can depend on various features of an IRS, but modeling tools using methods such as finite element analysis can factor in these features and help a user determine the proper angular adjustment. One such modeling tool is ANSYS®, a computer program created by ANSYS, Inc. of Canonsburg, Pa. Numerous other computer programs provide similar mechanical modeling.

The methods, systems, and devices discussed above are examples. Other examples and implementations are within the scope and spirit of the disclosure and appended claims. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. An inertial rate sensor comprising:
   a base; and
   a plurality of vibratory members coupled with the base and positioned symmetrically about an axis of symmetry, wherein each vibratory member includes:
      an elongate dimension extending outward from the base to a tip of the vibratory member; and
      an axis of motion along which the vibratory member is configured to move when driven in oscillation, the axis of motion being perpendicular to the elongate dimension;
   wherein the elongate dimension of each vibratory member is angled from the axis of symmetry such that each vibratory member, when driven in oscillation, includes a component of motion parallel to the axis of symmetry.

2. The inertial rate sensor as recited in claim 1, wherein each vibratory member is tapered such that a lateral dimension of each vibratory member decreases from the base to the tip of the vibratory member.

3. The inertial rate sensor as recited in claim 1, wherein the base and the plurality of vibratory members comprise a piezoelectric material.

4. The inertial rate sensor as recited in claim 1, wherein each of the plurality of vibratory members includes a portion of increased mass at the tip of the vibratory member.

5. The inertial rate sensor as recited in claim 4, wherein, for each of the plurality of vibratory members, the portion of increased mass is symmetric about an axis parallel to the elongate dimension of the vibratory member.

6. The inertial rate sensor as recited in claim 4, wherein, for each of the plurality of vibratory members, the portion of increased mass is symmetric about an axis parallel to the axis of symmetry.

7. A tuning fork for use in an inertial rate sensor, the tuning fork comprising:
   a base having a mounting area; and
   two vibratory members coupled with the base and positioned symmetrically on opposite sides of an axis of symmetry, each vibratory member including:
      an elongate dimension extending outward from the base to a tip of the vibratory member; and
      an axis of motion along which the vibratory member is configured to move when driven in oscillation, the axis of motion being perpendicular to the elongate dimension and substantially coplanar with the axis of symmetry and the elongate dimension;
   wherein the elongate dimension of each vibratory member is angled from the axis of symmetry such that each vibratory member, when driven in oscillation, includes a component of motion parallel to the axis of symmetry.

8. The tuning fork as recited in claim 7, wherein each vibratory member is tapered such that a lateral dimension of each vibratory member decreases from the base to the tip of the vibratory member.

9. The tuning fork as recited in claim 7, wherein the base and the plurality of vibratory members comprise a piezoelectric material.

10. The tuning fork as recited in claim 7, wherein each of the plurality of vibratory members includes a portion of increased mass at the tip of the vibratory member.

11. The tuning fork as recited in claim 10, wherein, for each of the plurality of vibratory members, the portion of increased mass is symmetric about an axis parallel to the elongate dimension of the vibratory member.

12. The tuning fork as recited in claim 10, wherein, for each of the plurality of vibratory members, the portion of increased mass is symmetric about an axis parallel to the axis of symmetry.

13. The tuning fork as recited in claim 10, wherein an angle between the elongate dimension of each vibratory member and the axis of symmetry is within a range of 1 to 3 degrees.

14. The tuning fork as recited in claim 10, wherein an angle between the elongate dimension of each vibratory member and the axis of symmetry is configured to reduce vibrations at the mounting area when the two vibratory members are driven in oscillation.

15. The tuning fork as recited in claim 10, further comprising a plurality of sense members coupled with the base, the sense members configured to detect rotation about a sensitive axis when the two vibratory members are driven in oscillation.

16. A structure for use in the inertial rate sensor, the structure comprising:
    a body of piezoelectric material, the body including a base and a plurality of vibratory members, wherein:
        the plurality of vibratory members are coupled with the base and positioned symmetrically about an axis of symmetry, each vibratory member including:
            an elongate dimension extending outward from the base to a tip of the vibratory member;
            a portion of increased mass at the tip of the vibratory member; and
            an axis of motion along which the vibratory member is configured to move when driven in oscillation, the axis of motion being perpendicular to the elongate dimension and substantially coplanar with the axis of symmetry and the elongate dimension; and
        the elongate dimension of each vibratory member is angled from the axis of symmetry such that the vibratory member, when driven in oscillation, includes a component of motion along the axis of symmetry.

17. The structure for use in the inertial rate sensor as recited in claim 16, wherein, for each of the plurality of vibratory members, the portion of increased mass is symmetric about an axis parallel to the elongate dimension of the vibratory member.

18. The structure for use in the inertial rate sensor as recited in claim 16, wherein, for each of the plurality of vibratory members, the portion of increased mass is symmetric about an axis parallel to the axis of symmetry.

19. The structure for use in the inertial rate sensor as recited in claim 16, further comprising a plurality of sense members coupled with the body, the sense members configured to detect rotation about a sensitive axis when the plurality of vibratory members are driven in oscillation.

20. The structure for use in the inertial rate sensor as recited in claim 16, wherein each vibratory member is tapered such that a lateral dimension of each vibratory member decreases from the base to the tip of the vibratory member.

* * * * *